(12) United States Patent
Hara et al.

(10) Patent No.: US 6,427,145 B1
(45) Date of Patent: Jul. 30, 2002

(54) DATABASE PROCESSING METHOD, APPARATUS FOR CARRYING OUT THE SAME AND MEDIUM STORING PROCESSING PROGRAM

(75) Inventors: Norihiro Hara, Kawasaki; Nobuo Kawamura, Atsugi; Tomohiro Nakayama; Kiyomi Hirohata, both of Yokohama, all of (JP)

(73) Assignees: Hitachi, Ltd., Tokyo; Hitachi Software Engineering Co., Ltd., Yokohama, both of (JP)

(*) Notice: Subject to any disclaimer, the term of this patent is extended or adjusted under 35 U.S.C. 154(b) by 0 days.

(21) Appl. No.: 09/516,778

(22) Filed: Mar. 1, 2000

(30) Foreign Application Priority Data

Jun. 30, 1999 (JP) ............................................ 11-184746

(51) Int. Cl.[7] .............................................. G06F 17/30
(52) U.S. Cl. .................................. 707/3; 707/2; 707/7
(58) Field of Search ................................ 707/1–5, 7–8, 707/10, 100–103, 104.1, 201, 203; 709/217, 201; 711/129, 216, 153, 173

(56) References Cited

U.S. PATENT DOCUMENTS 6,061,678 A * 5/2000 Klein et al. ..................... 707/3
6,067,543 A * 5/2000 Burrows ........................ 707/4
6,081,800 A * 6/2000 Ozbutun et al. ................ 707/3
6,151,604 A * 11/2000 Wlaschin et al. ........... 707/100

OTHER PUBLICATIONS

"Data Management System XDM E2 Programmer's Guide—vol. 2", published by Hitachi, Ltd., 1997, pp. 40–41 and 292–295.

* cited by examiner

*Primary Examiner*—Diane D. Mizrahi
(74) *Attorney, Agent, or Firm*—Mattingly, Stanger & Malur, P.C.

(57) ABSTRACT

A database processing system for analyzing a query issued to a database to generate a corresponding execution procedure for performing database processing in accordance therewith. A plurality of columns for storing data each constituted by a set of instances and conditions concerning the instances constituting the plurality of columns are entered. A query is inputted which contains a predicate for evaluating whether a set of instances which meet the designated conditions and which can be identified with the same subscript exists among the sets of instances stored in the plurality of columns. In response to the query, a decision is made as to whether or not an index has been generated for one or plural columns specified in the query predicate. When the index is generated, the index is accessed to acquire an identifier of table data which is "true" for a predicate. Unless the index is generated, a decision is then made as to whether or not column data acquired by accessing the database meet the conditions specified in the predicate contained in the query.

14 Claims, 12 Drawing Sheets

FIG. 1

STUDENT LIST TABLE 211

| REGISTERED ID NUMBER | NAME | DEPARTMENT | E-MAIL ADDRESS |
|---|---|---|---|
| 19997428 | KIYOSHI KOBAYASHI | INFORMATION TECHNOLOGY | kobakyo@dbrih.ac.jpn |
| 20000245 | TOMOHIRO SHIMIZU | ECONOMICS | tomohi@dbrih.ac.jpn |
| 20030712 | YUHKA HARA | LITERATURE | yuhka@dbrih.ac.jpn |
| 19900999 | JOH ASAMI | INFORMATION TECHNOLOGY | joh@dbrih.ac.jpn |
| 20020215 | SHIGERU YONEMOTO | INFORMATION TECHNOLOGY | yone@dbrih.ac.jpn |

STUDENT GRADE LIST TABLE 212

| REGISTERED ID NUMBER | SUBJECT | MARK |
|---|---|---|
| 19900999 | COMPUTER SCIENTIFICS | 65 |
| 19997428 | COMPUTER SCIENTIFICS | 80 |
| 19997428 | STATISTICS | 68 |
| 20000245 | STATISTICS | 25 |
| 20000245 | ENGLISH | 52 |
| 20020215 | ENGLISH | 68 |
| 20020712 | ENGLISH | 59 |
| 19997428 | ENGLISH | 95 |
| 19900999 | PHYSICS | 78 |
| 20000245 | PHILOSOPHY | 100 |
| 20030712 | GERMAN | 80 |
| 19900999 | GERMAN | 95 |

NORMALIZATION

STUDENT GRADE LIST TABLE 213

| REGISTERED ID NUMBER | NAME | DEPARTMENT | E-MAIL ADDRESS | SUBJECT | MARK |
|---|---|---|---|---|---|
| 19997428 | KIYOSHI KOBAYASHI | INFORMATION TECHNOLOGY | kobakyo@dbrih.ac.jpn | COMPUTER SCIENTIFICS | 80 |
| 19997428 | KIYOSHI KOBAYASHI | INFORMATION TECHNOLOGY | kobakyo@dbrih.ac.jpn | ENGLISH | 95 |
| 19997428 | KIYOSHI KOBAYASHI | INFORMATION TECHNOLOGY | kobakyo@dbrih.ac.jpn | STATISTICS | 68 |
| 20000245 | TOMOHIRO SHIMIZU | ECONOMICS | tomohi@dbrih.ac.jpn | STATISTICS | 25 |
| 20000245 | TOMOHIRO SHIMIZU | ECONOMICS | tomohi@dbrih.ac.jpn | ENGLISH | 52 |
| 20000245 | TOMOHIRO SHIMIZU | ECONOMICS | tomohi@dbrih.ac.jpn | PHILOSOPHY | 100 |
| 20030712 | YUHKA HARA | LITERATURE | yuhka@dbrih.ac.jpn | ENGLISH | 59 |
| 20030712 | YUHKA HARA | LITERATURE | yuhka@dbrih.ac.jpn | GERMAN | 80 |
| 19900999 | JOH ASAMI | INFORMATION TECHNOLOGY | joh@dbrih.ac.jpn | COMPUTER SCIENTIFICS | 65 |
| 19900999 | JOH ASAMI | INFORMATION TECHNOLOGY | joh@dbrih.ac.jpn | PHYSICS | 78 |
| 19900999 | JOH ASAMI | INFORMATION TECHNOLOGY | joh@dbrih.ac.jpn | GERMAN | 95 |
| 20020215 | SHIGERU YONEMOTO | INFORMATION TECHNOLOGY | yone@dbrih.ac.jpn | ENGLISH | 68 |

FIG. 14

| | C1 | C2 | C3 | C4 |
|---|---|---|---|---|
| row14 | 'ABC' | 1 | 'A' | 1 |
| 1401 | | | 'B' | 6 |
| | | | 'C' | 2 |
| | | | 'D' | 10 |
| | ⋮ | ⋮ | ⋮ | ⋮ |

1400

222  223

| 'A',1 | row14 | 221 |
| 'B',6 | row14 | 221 |
| 'C',2 | row14 | 221 |
| 'D',10 | row14 | 221 |

FIG. 15

| | C1 | C2 | C3 | C4 |
|---|---|---|---|---|
| row15 | 'ABC' | 1 | 'A' | 1 |
| 1501 | | | 'B' | 6 |
| | | | 'C' | 2 |
| | | | 'D' | 10 |
| | ⋮ | ⋮ | ⋮ | ⋮ |

1500

222  223

| 1,'A',1 | row15 | 221 |
| 1,'B',6 | row15 | 221 |
| 1,'C',2 | row15 | 221 |
| 1,'D',10 | row15 | 221 |

DATABASE PROCESSING METHOD, APPARATUS FOR CARRYING OUT THE SAME AND MEDIUM STORING PROCESSING PROGRAM

BACKGROUND OF THE INVENTION

The present invention relates to techniques applicable to a database processing method and an apparatus for carrying out the same. Further, the invention is concerned with a medium storing the database processing method in the form of a program executable with a computer.

In the real world, there exist many situations in which multivalued dependency information has to be handled, i.e., a plurality of information must be handled for a given item or instance. In the case of the relational database, it is a conventional approach to handle such sort of information in terms of normalized data models. In other words, the information or data is processed on the basis of the relations found between a plurality of tables and a query therefor.

For having better understanding of the present invention, description will first be made of a conventional database processing method by referring to FIG. 1 of the drawings. In this figure, there are shown, by way of example, two normalized tables, i.e., a student grade list table 212 containing normalized information concerning grades of students and a student list table 211 containing information concerning E-mail addresses of the students and others. As can be seen in the figure, in both of the student list table 211 and the student grade list 212, information concerning the registered ID numbers are entered, wherein relation is established between the student list table and the student grade list table with the aid of the registered ID number which thus serves as a key. As can readily be appreciated, the information (registered ID number) serving as the key presents redundancy. Consequently, the database capacity for affording such redundancy is required.

In conjunction with the example illustrated in FIG. 1, it is not supposed, by way of example, that a guide for English conversation school is to be dispatched to the students whose grades are marked by scores not greater than "60" and hence the E-mail addresses of these students have to be acquired from the database. In that case, the statement of query for the student list table as well as the student grade list table will become much more complicated, as mentioned below. Furthermore, because combine processing is required, the time involved in the processing will increase.
SELECT students-list.E-mail-address
   FROM students-list, grade
     WHERE
       grade.subject='English' AND
       grade.mark<=60 AND
       students-list.registered-ID-number=
       grade.registered-ID-number As is obvious from the above, the approach based on the normalized data model requires increasing of the database capacity because the registered ID numbers are redundantly entered in both the tables. Additionally, the query processing becomes complicated. Also, because the combine processing is required, the time taken for the search processing will increase.

On the other hand, execution of the database search processing with an unnormalized table can be conceived as another approach. In FIG. 1, a student grade list table 213 is shown which has been realized by unnormalizing the two tables mentioned above. In this case, the query statement can be simplified as follows.

SELECT DISTINCT E-mail-address
   FROM grade
     WHERE subject='English' AND mark<=60

However, in the unnormalization approach mentioned above, the data other than those of the columns "subject" and "mark" (i.e., the data of registered ID number, the names, the subjects and the E-mail addresses) presents redundancy, as a result of which capacity or volume of the database is increased. The query statement is certainly simplified. However, the number of items entered in each row increases. Although the combine processing can be spared, redundancy has to be suppressed with "DISTINCT", which presents an obstacle in realizing high-speed search and retrieval.

Concerning the database query language SQL (Structured Query Language), a collection type SQL has been adopted as one of the functions for realizing object-oriented extension with a view to allowing sets of information to be handled with high efficiency. Furthermore, it is known to store a plurality of information as one column data similarly to the array by using repetitive columns. For more particular in this respect, reference should be made to HITACHI: "Guidance for XDM E2-Series Program Creations (XDM/RD E2)", p. 27 (1997).

SUMMARY OF THE INVENTION

In both the collection type database and the repetitive column type database, no relations are established between/among the elements in the columns. Consequently, any attempt to structurize an application program for processing the query containing a plurality of conditions, as described above, will be forced to resort to such an approach which is based on the relations among a plurality of normalized tables or alternatively such an approach based on the unnormalized table, as described above, which will however incur increasing of capacity of the database, complication of the query statement and eventually degradation of performance of the search processing.

In the light of the state of the art described above, it is an object of the present invention to solve the problems mentioned above and provide techniques or technology with which access to a database designed for managing data in terms of sets of mutually comparable instances can be realized in a suitable or optimal manner.

In view of the above and other objects which will become apparent as the description proceeds, there is provided according to an aspect of the present invention a database processing system which is designed to handle data of such data type which includes sets of instances and which allows the individual instances to be definitely determined with subscripts. For accessing the database processing system according to the invention, a query is used which contains a predicate or alternatively a function which includes at least two designations for the column data of the data type mentioned above and designation of conditions concerning the column data. Upon reception of the query, the database processing system analyzes the query to make decision as to whether or not an index has been generated for the column data specified in the predicate or alternatively by the function.

In the case where the index is generated availably, then an execution procedure is determined such that the index is accessed. Upon database processing, the index is accessed in accordance with the above-mentioned execution procedure to thereby acquire an identifier of table data having a set of instances which meet the conditions specified in the predicate or designated by the function and which can be identified by same subscript.

On the other hand, unless the index is generated, an execution procedure for accessing the table data is determined. Upon database processing, the table data is accessed in accordance with the execution procedure mentioned just above to acquire a set of instances which can be identified by a same subscript from the instances which constitute the column data of the data type specified in the predicate or by the function, whereon the individual instances of the set acquired from at least two column data of the aforementioned data type are evaluated in view of the conditions specified in the predicate or designated by the function.

The index mentioned above includes as the index constituting columns at least two columns (also referred to as the column data) of the data type which is constituted by set(s) of instances and which allows the individual instances to be identified by the subscript(s), and the index is composed of index entries including the set of instances identified by same subscript among the instances constituting the column data of the data type, column data other than the column data of the data type and row identifiers for identifying row data, respectively. Upon execution of table data insert, delete or update processing, the index entries are generated for maintaining the index to be valid.

As will be appreciated from the above, with the database managing system according to the present invention, a set of information of a given data type can be stored as column data in a table for management, and a plurality of elements of the column can be evaluated in terms of a set. Thus, the capacity of the database oriented for storage of tables can be reduced to a possible minimum while ensuring a high-speed search for the set handling columns with a simplified query description.

Parenthetically, it should be added that the database processing system according to the present invention may be implemented in the form of a method, apparatus, program or a medium recording the program for practical applications.

BRIEF DESCRIPTION OF THE DRAWINGS

In the course of the description which follows, reference is made to the drawings, in which:

FIG. 1 is a view showing tables in a case where sets of instances of same data type are handled in a conventional database;

FIG. 14 is a view showing another example of the index key structure according to an embodiment of the present invention; and FIG. 15 is a view showing yet another example of the index key structure according to an embodiment of the present invention.

DESCRIPTION OF THE EMBODIMENTS

Figure 2:
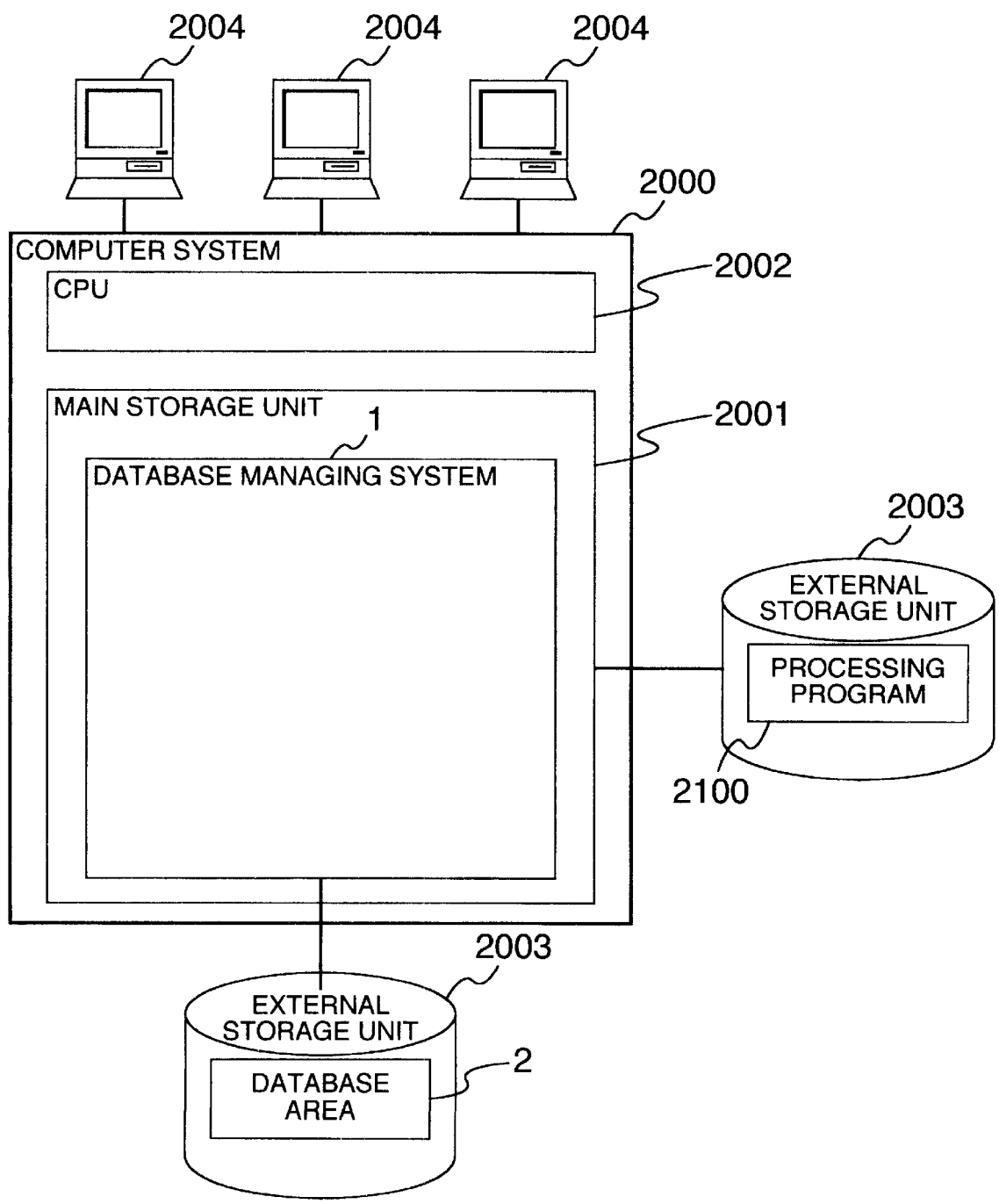
FIG. 2 is a schematic block diagram showing, by way of example, a hardware structure of a computer system according to an embodiment of the present invention.

The present invention will be described in detail in conjunction with what is presently considered as preferred or typical embodiments thereof by reference to the drawings. In the following description, like reference characters denote like or corresponding parts throughout the several views. Also in the following description, it is to be understood that such terms as "column" "row" and the like are words of convenience and are not to be construed as limiting terms.

Now, description will be made of a database managing system according to an embodiment of the present invention which is capable of executing processings for a database at a high speed, wherein the database is designed to handle a set of instances (also referred to as the instances set) of a same species or type as the data.

At first, the basic concept underlying the present invention will be described briefly by reference to FIG. 3.

In the database managing system according to an embodiment of the present invention, a set of the instances of a same data type or species is managed as what is termed the column data. Hereinafter, the data of a set of instances of a same data species will hereinafter be referred to as the repetitive type data only for convenience of description. Similarly, a column in which the data of the repetitive type are entered will hereinafter be referred to as the repetitive column. Further, the individual instances will be referred to as the elements of the repetitive column.

Figure 3:
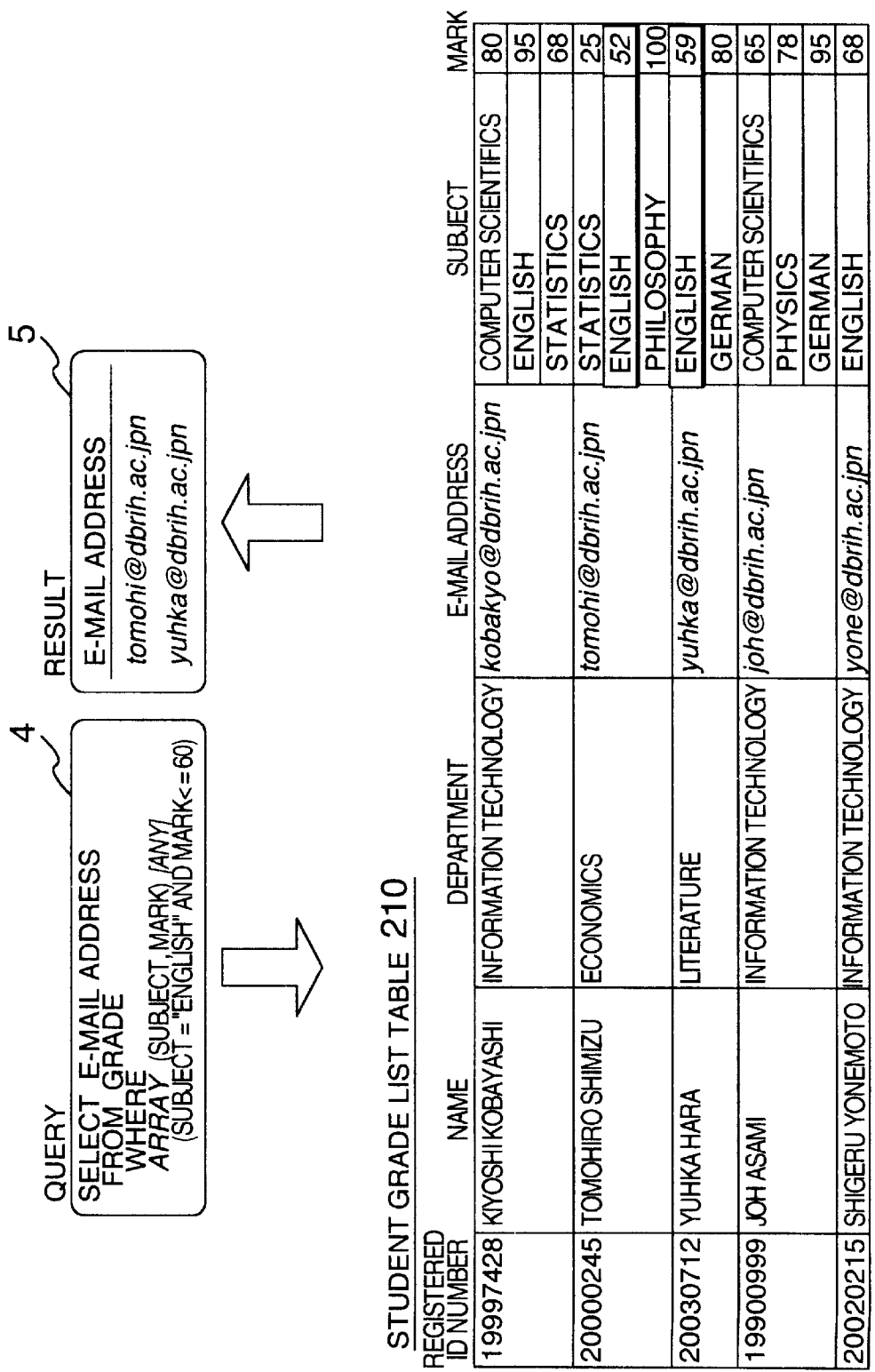
FIG. 3 is a view for illustrating schematically the basic concept underlying the present invention.

Referring to FIG. 3 which shows an image of a student grade list 210 in the form of a table, a subject column, i.e., column labeled "SUBJECT", and a marked score column (hereinafter also referred to simply as the mark column), i.e., column labeled "MARK", are each defined as the repetitive column. A definition statement for the student grade list table which has the repetitive columns may be expressed, for example, as mentioned below.

| CREATE TABLE grade ( | |
|---|---|
| Registered-ID-number | CHAR(8) |
| Name | MVARCRAR (10), |
| Department | MVARCHAR (10), |
| E-mail-address | VARCHAR (32), |
| Subject | MVARCHAR (16) ARRAY[32], |
| Mark | INTEGER ARRAY[32]) |

At this juncture, it is to be noted that the repetitive column is designated by a key word "ARRAY". Further, the above statement indicates that the subject column allows the MVARCHAL-type data of a maximum definition length of 16 bytes to be stored or entered for management up to 32 elements at maximum. Similarly, the above statement indicates that the mark column is capable of storing the INTEGER-type data up to 32 elements at maximum.

In conjunction with the repetitive column, it should also be mentioned that any one of the elements entered for management in the repetitive column can discriminatively be identified by a value interposed between square brackets "[" and "]" which succeed to the repetitive column name in the query statement. By way of example, the query statement projecting the value of an element identified or determined by "1" among the elements entered in the subject column may be expressed as follows:

SELECT subject[1] FROM grade

Parenthetically, in most of practical cases, the numeric value "N" placed or interposed between the square brackets "[" and "]" may duly be regarded as designating the N-th element in the subject column. Hereinafter, the value interposed or placed between the square brackets "[" and "]" which succeeds to the repetitive column name in the query statement will be referred to as "subscript" only for convenience of description.

For proceeding with the description, it is assumed, only by way of example, that guide information concerning an English conversation course is to be sent by E-mail to the students whose marks for English are not greater than the score "60" and thus the E-mail addresses of these students have to be acquired. In that case, for realization of the query for the student grade list, a query statement 4 mentioned below (also see FIG. 3) may be inputted to the database managing system.

SELECT E-mail-address
    FROM grade
        WHERE ARRAY (subject, mark) [ANY] (subject= 'English' AND mark<=60)

In the case of the instant embodiment of the invention, an ARRAY predicate is used for realizing the evaluation that the mark for the subject 'English' is not greater than the score "60". With the ARRAY predicate, a plurality of the repetitive columns designated within the parenthesis "()" which succeeds to "ARRAY" in the statement are regarded as repetition of plural items represented, respectively, by sets each of the elements having a same subscript, and if any one of these elements satisfies the conditions given within the parenthesis "()" which succeeds to "[ANY]", truth value "true" is sent back. In the case where one repetitive column is designated within the parenthesis "()" succeeding to "ARRAY" rather than a plurality of repetitive columns, the ARRAY predicate returns truth value "true" when any one element entered in the designated repetitive column meets the conditions designated within the parenthesis "()" which succeeds to "[ANY]".

It will now be appreciated that the above-mentioned query statement including the ARRAY predicate is to realize the query for acquiring the E-mail address values of the table rows in each of which the value of the element of the subject column identifies 'English' and in each of which the value of the element of the mark column corresponding to the above-mentioned element is not greater than the score "60".

Upon reception of the query 4 mentioned above from the user, the database managing system performs evaluation of the subject column and the mark column in the individual rows 301 to 305 of the student grade list in the light of the ARRAY predicate. As a result of the evaluation, the row 302 containing the element for which the marked score of the subject 'English' is "52" and the row 303 containing the element for which the marked score of the subject 'English' is "59" are selectively determined as the rows which meet the imposed conditions to be sent back or returned to the user as a result of the search (denoted by reference numeral 5 in FIG. 3).

As will be appreciated from the above, through the procedure described above, the sets of the instances which have heretofore been realized in terms of the relations between or among a plurality of tables in the case of the conventional relational database model can be stored in a single table as the values of the columns capable of handling the sets according to the teachings of the present invention, whereby the capacity of the database can be reduced to a possible minimum. Besides, by virtue of the capability of evaluating the elements of plural repetitive columns as the sets or combinations, respectively, the search for the columns handling the sets can be realized with a simplified query description or statement. Additionally, because the query statement is destined for the single table mentioned above and thus the access areas can be reduced to a minimum, the processing for executing the query can be realized efficiently and effectively. Further, for realization of the query, the relevant processing(s) can be executed at a further increased speed by adopting or using as key the index indicating the sets or combinations of the elements entered in the plural repetitive columns.

Figure 4:
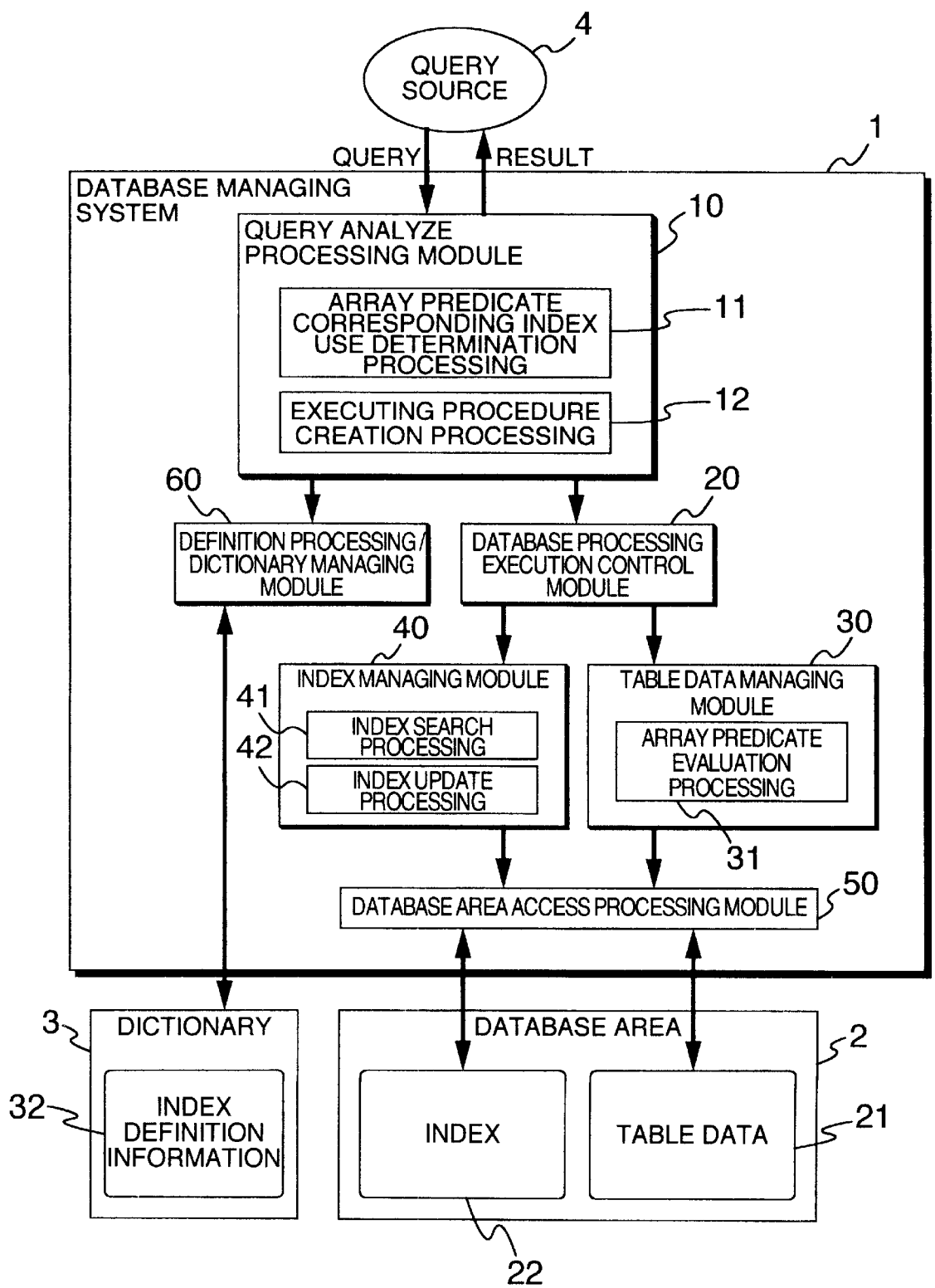
FIG. 4 is a functional block diagram showing a database managing system according to an embodiment of the present invention.

Now, description will be directed to a configuration of a structure of the database managing system. FIG. 4 is a block diagram showing a structure of the database managing system according to an embodiment of the invention. As can be seen in FIG. 4, the database managing system 1 according to the instant embodiment of the invention is comprised of a query analyze processing module 10, a database processing execution control module 20, a table data managing module, an index managing module 40, a database area access processing module 50 and a definition processing/ dictionary managing module 60.

The query analyze processing module 10 is designed to receive the query request 4 issued from the user or an application program for analyzing the query to thereby generate an appropriate or proper execution procedure for allowing the access to the database. Further, the query analyze processing module 10 also serves for a function for sending back to the query source the data acquired as the result of execution of the query request 4 by making access to the database. In case the query request 4 represents a data manipulation processing (DML) request such as storage, deletion, updating or search of data, then the processing control is transferred to the database processing execution control module 20. On the other hand, when the query request 4 indicates a data definition processing (DDL) such as table definition, index definition or the like, the processing control is transferred to the definition processing/ dictionary managing module 60. Furthermore, when it is found upon analyzing the query 4 that the query statement contains the ARRAY predicate, then the query analyze processing module 10 performs a processing 11 for determining whether the index for evaluating the ARRAY predicate is available or not. The result of the index availability determination processing is sent to the execution procedure creation processing 12 to be reflected in the execution procedure.

The database processing execution control module 20 is designed to control the execution of access to the database in accordance with the execution procedure generated by the query analyze processing module 10 through cooperation with the table data managing module 30 and the index managing module 40. The data acquired as the result of the database access is transferred to the query analyze processing module 10 to be sent back to the query request source denoted by reference numeral 4 in FIG. 4.

The table data managing module 30 is designed to manage the table data 21 stored in the database area 2. In more concrete, the table data managing module 30 performs the processings for storage, deletion, updating and search of the data through the medium of the database area access processing module 50. The table data 21 also contains the data concerning the table having the repetitive columns described previously by reference to FIG. 3. The table data managing module 30 is further imparted with a function for performing the ARRAY predicate evaluation processing 31 for the row data of the table when the ARRAY predicate is contained in the query statement and when the execution procedure mentioned previously indicates that no index is used for evaluating the ARRAY predicate.

The index managing module 40 is in charge of managing the indexes 22 stored in the database area 2. More specifically, the index managing module 40 is imparted with a function for performing an index update processing 42 in accompany with updating of the table data 21 to thereby update the relevant indexes 22 through the medium of the database area access processing module 50. Additionally, the index managing module 40 is imparted with a function for executing an index search processing 41 for allowing the search to be performed for the table rows which are "true" for the ARRAY predicate at a high speed by making access to the indexes 22.

The database area access processing module 50 is designed to make access to the table data 21 or the indexes 22 stored in the database area 2 in accordance with the request issued from the table data managing module 30 or the index managing module 40 as described hereinbefore.

The definition processing/dictionary managing module 60 is in charge of managing various definition information such as schema information, table information and the like which are stored in the dictionary 3. The definition information stored in the dictionary 3 also includes index definition information 32 for the indexes 22 which in turn are stored in the database area 2. Further, the definition processing/dictionary managing module 60 is designed to register in the dictionary 3 the definition information resulting from the analysis performed by the query analyze processing module 10 when the query request 4 indicates a data definition processing (DDL).

The program or programs for realizing the functions of the query analyze processing module 10, the database processing execution control module 20, the table data managing module 30, the index managing module 40, the database area access processing module 50 and the definition processing/dictionary managing module 60 of the database managing system 1 may be recorded on a recording medium such as a CD-ROM or the like and stored on a magnetic disk or the like to be loaded in a memory for execution as occasion requires. Of course, the medium for recording the program(s) mentioned above is never limited to the CD-ROM. Other appropriate recording medium may be used to this end. Further, the program(s) may be loaded onto the memory for execution thereof by way of another computer system connected to on a network.

FIG. 2 is a schematic block diagram showing exemplarily a hardware structure of a computer system according to an embodiment of the present invention. Referring to the figure, the computer system denoted generally by numeral 2000 is comprised of a CPU 2002, a main storage unit 2001, an external storage unit 2003 such as a magnetic disk device or the like and a large number of terminals 2004. The database managing system 1 described hereinbefore by reference to FIG. 4 is installed in the main storage unit 2001, while the database area 2 including the table data 21 and the indexes 22 to be managed by the database managing system 1 is stored in the external storage unit 2003. Further, the dictionary 3 mentioned previously is also stored in the external storage unit 2003. Additionally, the program(s) for realizing the database managing system 1 is stored in the external storage unit 2003 as well.

Figure 5:
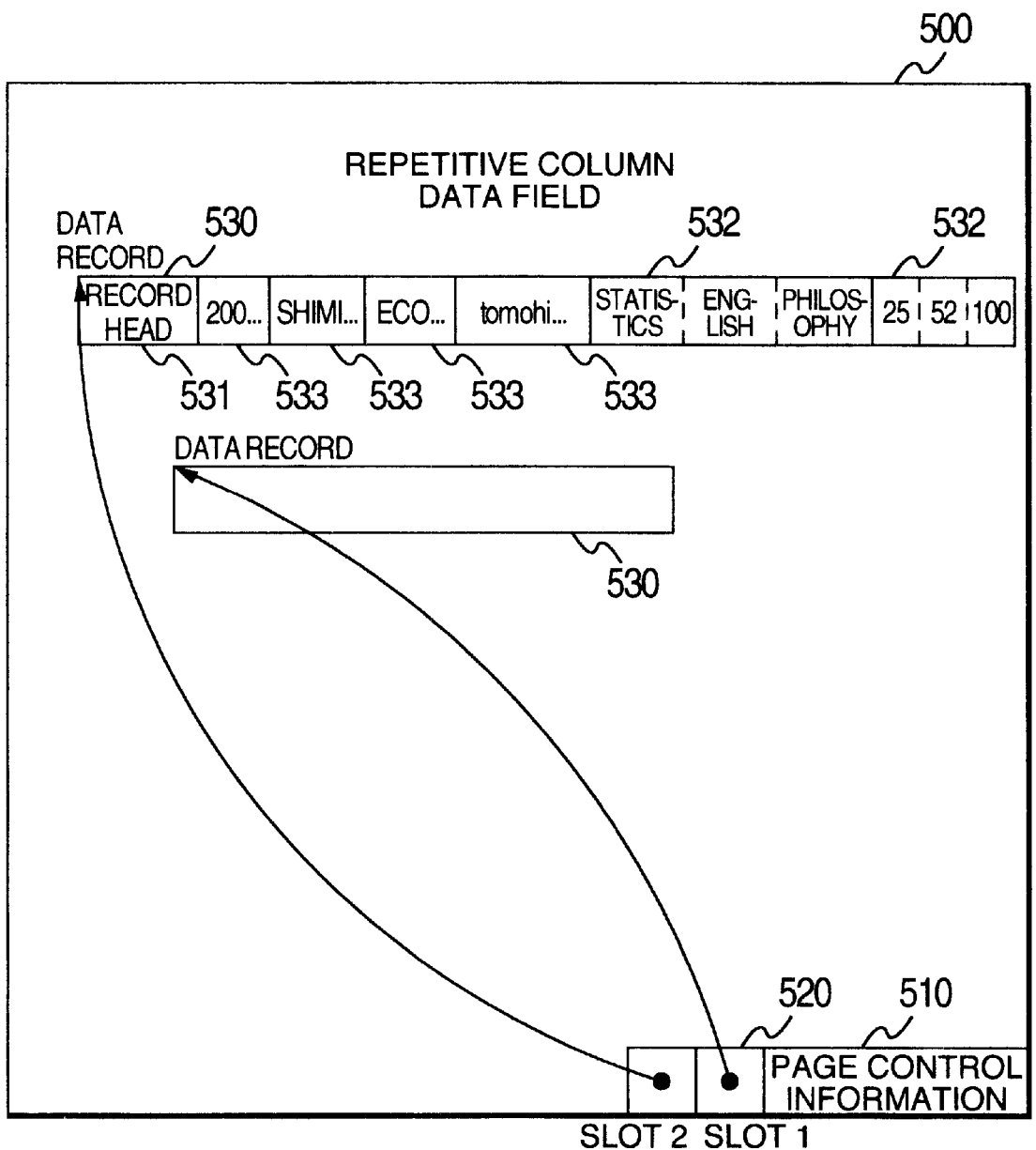
FIG. 5 is a view for illustrating, by way of example, a table data record storage structure according to an embodiment of the present invention.

FIG. 5 is a view for illustrating, by way of example only, a storage structure of the individual row data stored as the table data 21. The row data are stored each in the form of a data record 530 in a page 500 which serves as a unit base for the data input/output operation. In this conjunction, it should also be mentioned that the page 500 constitutes a structural unit of the database area 2. A plurality of data records 530 can be stored in one page 500. The store location or position of the data record 530 on the page 500 can be designated with the aid of slots 520. In the slot areas 520, there are stored the locations or positions of the data records 530, respectively, relative to the top of the page 500. Page control information 510 is provided or effecting slot management in view of slot allocation status or the like and area management in view of page occupation status or the like. The data record 530 includes a repetitive column data field 532 in which data of the repetitive column is stored. Further, the data record 530 contains data fields 533 for the other ones than the repetitive column and a record header 531 for managing the data fields in the data record 530.

In the repetitive column data fields 532, there are stored in an array structure the elements constituting the repetitive column data. By virtue of this arrangement, access to the element can readily be realized by using the subscript mentioned hereinbefore. In the case of the database managing system now under consideration, the repetitive column data fields 532 are stored directly in the data record 530. However, the repetitive column data fields may be realized as another data record which can logically be pointed from the data record 530. Further, the elements constituting the repetitive column data need not necessarily be implemented in the array structure. What is required is that the store position or location can be determined with the subscript.

Figure 6:
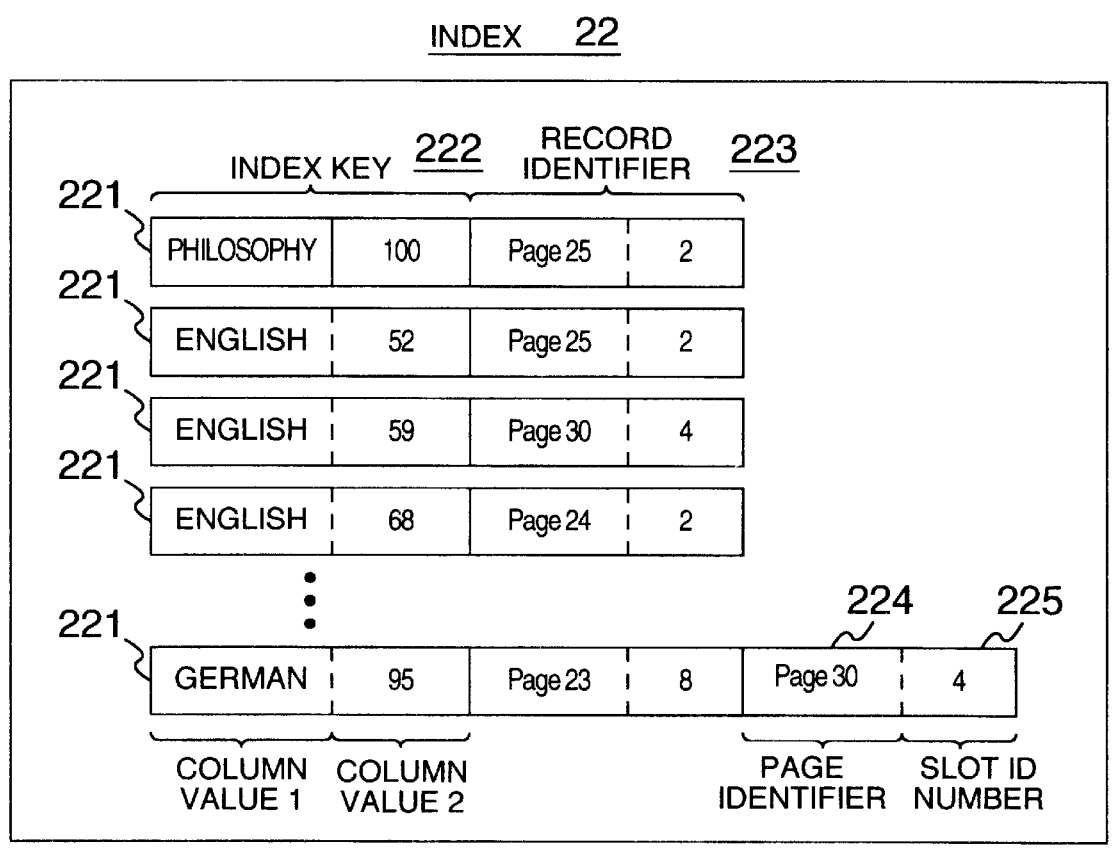
FIG. 6 is a view for illustrating, by way of example, a structure of an index adopted in the database managing system according to an embodiment of the invention.

FIG. 6 is a view for illustrating, by way of example, a structure of the index 22 in the database managing system according to the instant embodiment of the invention. More specifically, a typical structure of the index 22 which is destined to be stored in the database area 2 is illustrated in FIG. 6. As can be seen from this figure, the index 22 is composed of index entries 221.

Referring to FIG. 6, each of the index entries 221 is comprised of an index key 222 and a record identifier 223 for making it possible to access the data record 530 (see FIG. 5) which is the entity of the relevant row data.

The index key 222 is generated on the basis of the value of the element identified by a given subscript and contained in the repetitive column data having the index defined in the relevant row data. In the case where the index is defined for a plurality of repetitive columns, the index key 222 is generated on the basis of a combination or set of the values of the elements determined by the subscripts contained in the data of the plural repetitive columns, respectively.

In the case of the example illustrated in FIG. 6, there is shown the index which is defined for the two repetitive columns (subject and mark) of a student grade list table. In that case, the index key 222 assumes a data structure of "the value of the element of the subject column+value of the element of the mark column".

Definition of the index can be realized in the form of a request statement analogous to SQL (Structured Query Language), as exemplified by the undermentioned one.

CREATE INDEX ARRAY_IDX1 ON grade (subject, mark)

where ARRAY —IDX1 represents an index name affixed to the index defined.

Each of the record identifiers 223 is composed of a page identifier 224 for identifying definitely the page 500 in which the data record 530 is stored and a slot ID number 225 identifying the slot 520 for specifying the store position of the data record in the page. The slot ID numbers 225 are assigned sequentially, starting from the one adjacent to the page control information 510 in the page storage structure (see FIG. 5). In the case of the example illustrated in FIG. 6, a structure "page identifier+slot ID number" is adopted. However, no problem will arise in the structure "slot ID number+page identifier". Access to the data record can be realized with the aid of the record identifier 223. More specifically, access to the store page is carried out by using the page identifier 224 constituting a part of the record identifier 223, and then the data record store position entered in the slot corresponding to the slot ID number 225 is acquired for thereby making access to the data record 530.

Since the repetitive column of one row data has a plurality of elements, there are available a number of index keys 222 which number is equal to the number of elements, i.e., index entries 221, for the one row data. To say in another way, the same record identifier 223 exists in a plurality of index entries 221, respectively. In the case of the example shown in FIG. 6, the record identifiers {Page 25, 2} exist in the two index entries 221, respectively. Further, the record identifier {Page 30, 4} also exist in the two index entries 221, respectively.

At this junction, it should be added that the index may be defined not only for a plurality of repetitive columns but also for the combination of the other column than the repetitive column and the repetitive column.

Figure 13:
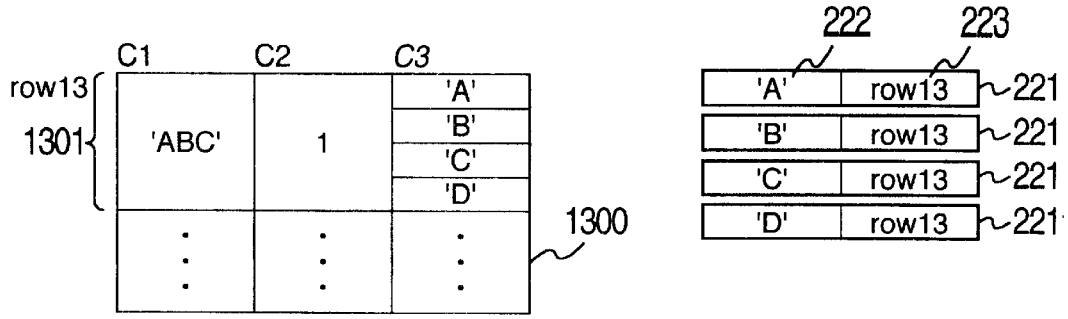
FIG. 13 is a view showing an example of an index key structure according to an embodiment of the present invention.

FIGS. 13, 14 and 15 are views showing, by way of example, variations of the index structure.

FIG. 13 shows an example of the index entries 221 in the case where the index is defined for one repetitive column. Shown at the right-hand side of a table 1300 are the index entries 221 which correspond to the row data 1301 (having the record identifier of "row 13") of the table 1300 with the index having been defined for the repetitive column C3. The index keys 222 contained in the index entries 221 are generated in dependence on the values of the elements, respectively, of the repetitive column C3. Since the number of the elements stored in the repetitive column C3 is four in the case of the row data 1301, the number of the index entries 221 each having the record identifier "row 13" is four. In this conjunction, it is to be mentioned that when redundancy or overlapping such as duplication occurs in the values of the elements stored in the repetitive column, a number of the record identifiers which correspond to that of overlapping values are stored in one index entry 221 for management.

FIG. 14 shows an example of the index entries 221 in the case where the index is defined for two repetitive columns. More specifically, shown at the right-hand side of a table 1400 are the index entries 221 which correspond to row data 1401 (having the record identifier of "row 14") of the table 1400 with the indexes being defined for the repetitive columns C3 and C4, respectively. The index keys 222 contained in the index entries 221 are generated in dependence on the values of the elements, respectively, of the repetitive column C3 and the values of the elements, respectively, of the repetitive column C4 which correspond to the subscripts of the elements, respectively, of the repetitive column C3.

FIG. 15 shows an example of the index entries 221 in the case where the index is defined for two repetitive columns and one of the other columns than the repetitive columns. More specifically, there are shown at the right-hand side of the table 1500 the index entries 221 which correspond to row data 1501 (having the record identifier of "row 15") of the table 1500 with the indexes being defined for the repetitive columns C3 and C4 and one other column C2, respectively. The index keys 222 contained in the index entries 221 are generated, respectively, in dependence on three element values, i.e., the values in the column C2, the values of the elements of the repetitive column C3 and the values of the elements of the repetitive column C4 which correspond, respectively, to the subscripts of the elements of the repetitive row C3.

The index 22 now under consideration is provided for the purpose of acquiring the record identifier of the data record having the column value which coincides with the conditions designated or specified in the ARRAY predicate. Accordingly, in most of practical applications, the index entries 221 need not be stored in the form of a table structure as described hereinbefore in conjunction with the exemplary embodiment of the invention but may be implemented as a high-speed data access enabling form such as a B-tree (balanced multiway search tree) index, as illustrated in FIG. 7.

Figure 7:
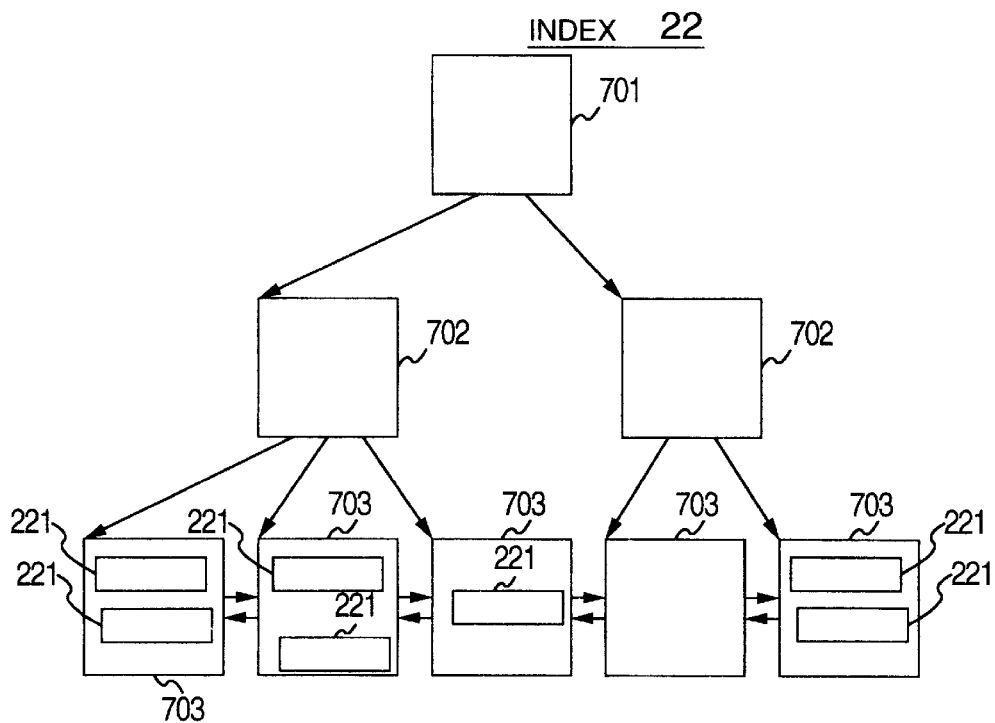
FIG. 7 is a view for illustrating, by way of example, a B-tree index structure which can be adopted in the database managing system according to an embodiment of the present invention.

FIG. 7 is a view for illustrating an exemplary implementation of the data structure of the index 22 as a B-tree index according to another embodiment of the present invention. As can be seen in FIG. 7, the B-tree index 22 is comprised of a root node 701, intermediate nodes 702 and leaves nodes 703.

The tree structure is realized with the root node 701 being positioned atop. The index entries 221 are stored for management in the distal leaves nodes 703, respectively, of the tree structure, whereas there are stored in the root node 701 and the intermediate nodes 702, respectively, entries having respective pointers to the nodes of hierarchically lower rank.

In many practical applications, the root node 701, the intermediate nodes 702 and the leaves nodes 703 may each be realized by the page which represents a unit for data input/output operation. Through the index search processing 41 described hereinbefore by reference to FIG. 4, the tree structure is traced from the root node or page 701 to the leaf node 703 by way of the intermediate node 702 with the key generated under the conditions designated or specified in the ARRAY predicate. The root node 701 and the intermediate nodes 702 may be resident in a memory. In that case, the input/output frequency can be decreased, whereby a high-speed access can be achieved.

Figure 8:
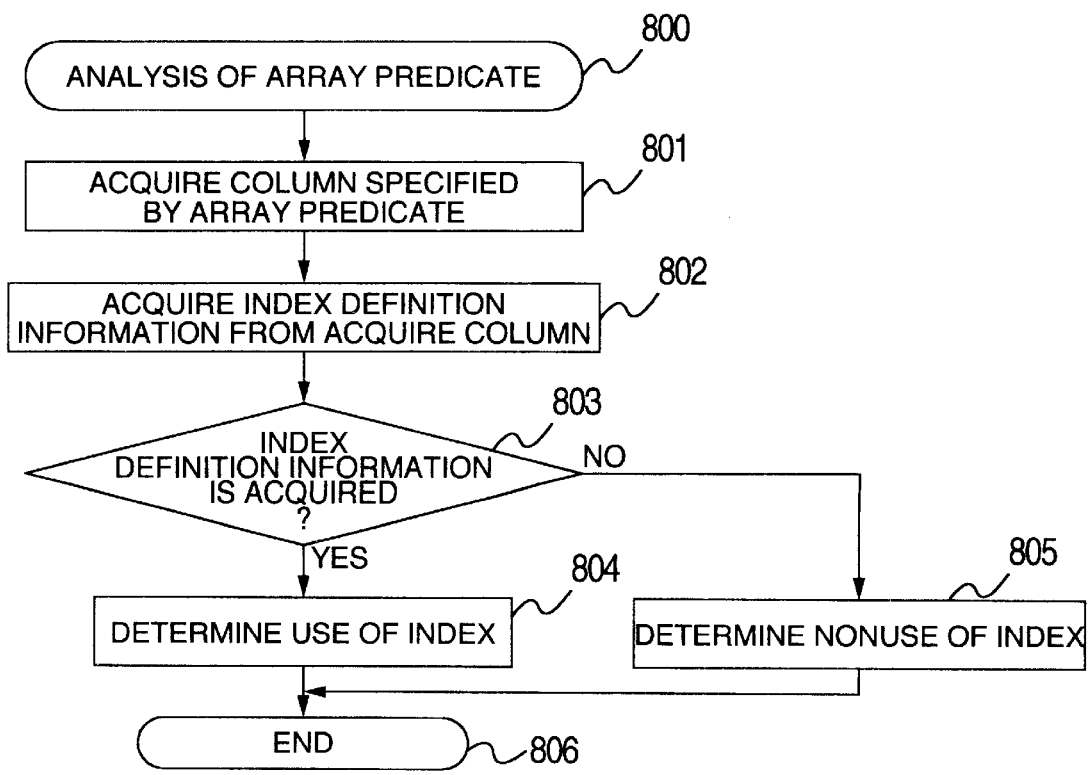
FIG. 8 is a flow chart for illustrating a processing procedure executed by a query analyze processing module in the database managing system according to an embodiment of the present invention.

FIG. 8 is a flow chart for illustrating a processing procedure carried out by the query analyze processing module 10 in the database managing system according to the instant embodiment of the invention. More specifically, FIG. 8 shows the contents of a processing 11 for making decision as to the use of the index corresponding to the ARRAY predicate, which processing is executed by the query analyze processing module 10 when the ARRAY predicate makes appearance in the query request 4.

For analyzing the query request 4 issued by the user, it is decided on the basis of the index definition information 32 registered in the dictionary 3 whether an execution procedure in which the index is used for evaluation with the ARRAY predicate is to be generated or alternatively an execution procedure in which no index is used is to be generated. Referring to FIG. 8, in a step 801, the ARRAY predicate is first analyzed for acquiring the column names designated or specified in the ARRAY predicate. Subsequently, in a step 802, the index definition information relevant to the acquired column names is acquired. The processing for acquiring the index definition information 32 is executed by activating the processing/dictionary managing module 60. When it is decided in a step 803 that the relevant index definition information has been acquired (i.e., when the decision step 803 results in "Yes"), the processing proceeds to a step 804 where generation of the execution procedure in which the index is used for the evaluation with the ARRAY predicate is determined, whereupon the processing comes to an end in a step 806.

On the other hand, unless the relevant index definition information is found available in the step 803, decision is then made that the usable index is not defined, which is then followed by a step 805 where generation of the execution procedure is determined such that the repetitive column data is evaluated by accessing the data record without using the index for evaluation of the ARRAY predicate. The processing then comes to an end in a step 806.

Figure 9:
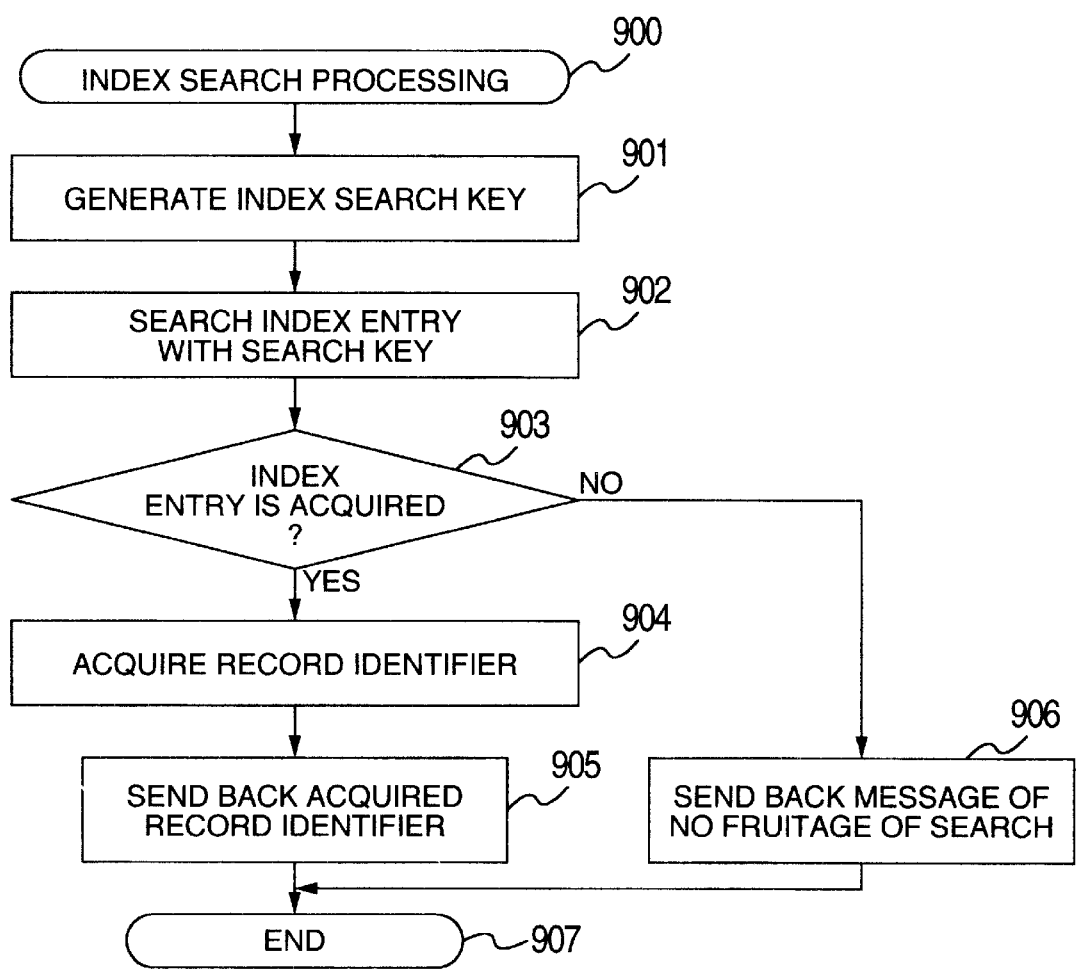
FIG. 9 is a flow chart for illustrating an index search processing procedure executed by an index managing module of the database managing system according o an embodiment of the invention.

FIG. 9 is a flow chart for illustrating a processing procedure executed by the index managing module 40 of the database managing system according to the instant embodiment of the invention. More specifically, FIG. 9 illustrates contents of the index search processing 41 which is executed in the case where the ARRAY predicate is contained in the query statement and where the index usable for evaluation with the ARRAY predicate is available with the use of the index being determined by the processing procedure described hereinbefore by reference to FIG. 8.

At first, in a step 901, the index search key is generated under the conditions designated or specified in the ARRAY predicate. By way of example, in the case of the query statement described hereinbefore by reference to FIG. 3, "subject='English'" and "mark<=60" are used for generating the index search key {'English', 60}. Subsequently, in a step 902, index entry search is performed by using the index search key generated in the step 901. In the case of the example mentioned just above, the index entry or entries which meet the conditions "subject='English' AND mark<=60" are searched. When the index entry or entries which coincide with the specified conditions are found in a step 903, the processing proceeds to a step 904 where the record identifiers contained in the index entry or entries are acquired, whereon the acquired record identifiers are sent back to the table data managing module 30 in a step 905. The index search processing then comes to an end in a step 907.

The record identifiers sent back to the table data managing model are used for accessing the data record which is performed by the table data managing module 30 for thereby carrying out the projection processing or the like.

By contrast, unless the index entry or entries which coincide with the specified conditions are found in the step 903, the processing proceeds to a step 906 where the search result that the relevant record identifier is not found is sent back to the table data managing module 20 30, whereupon the index search processing is terminated (step 907).

Figure 10:
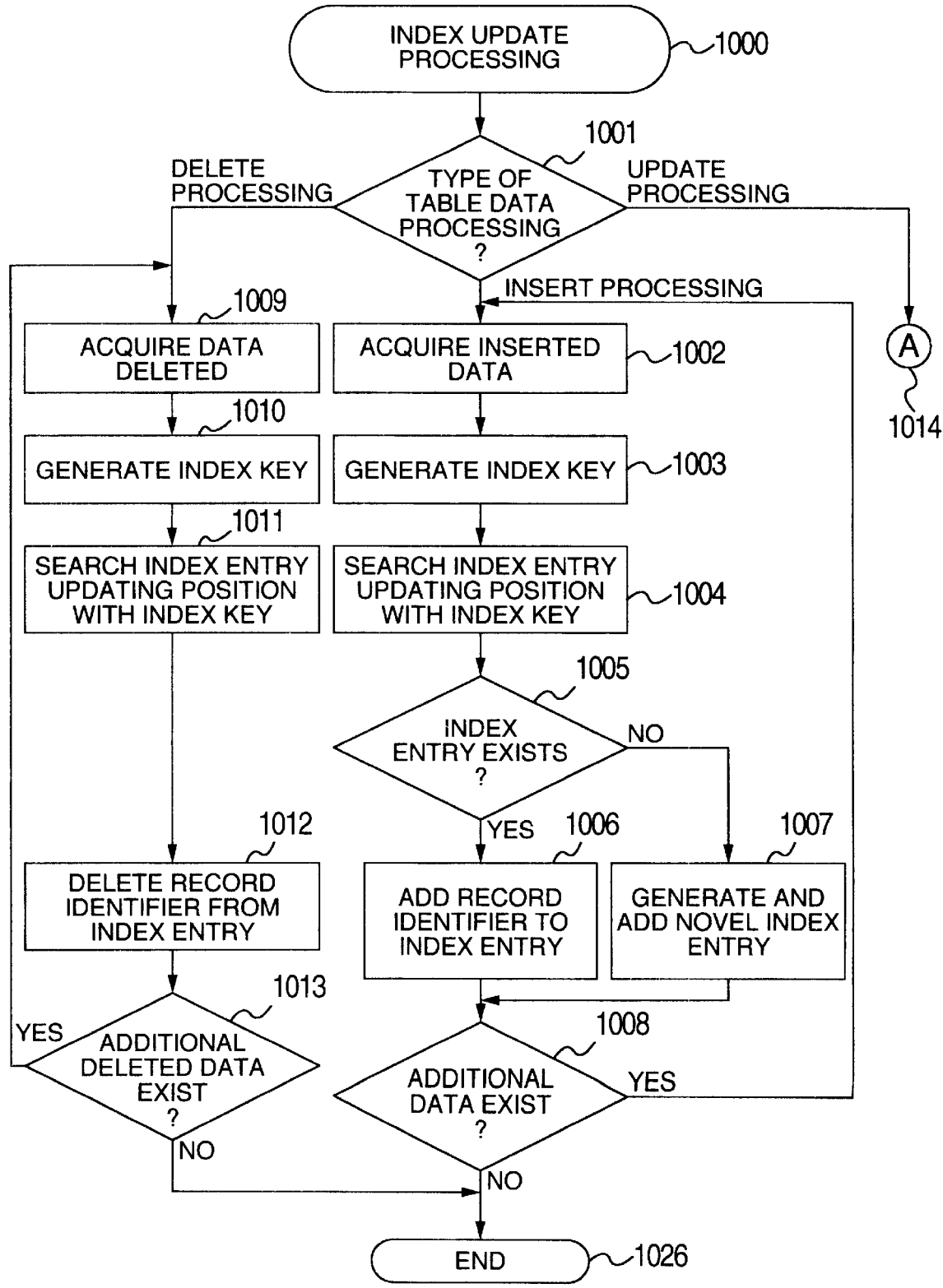
FIG. 10 is a flow charts for illustrating an update processing procedure executed by the index managing module according to an embodiment of the present invention.
Figure 11:
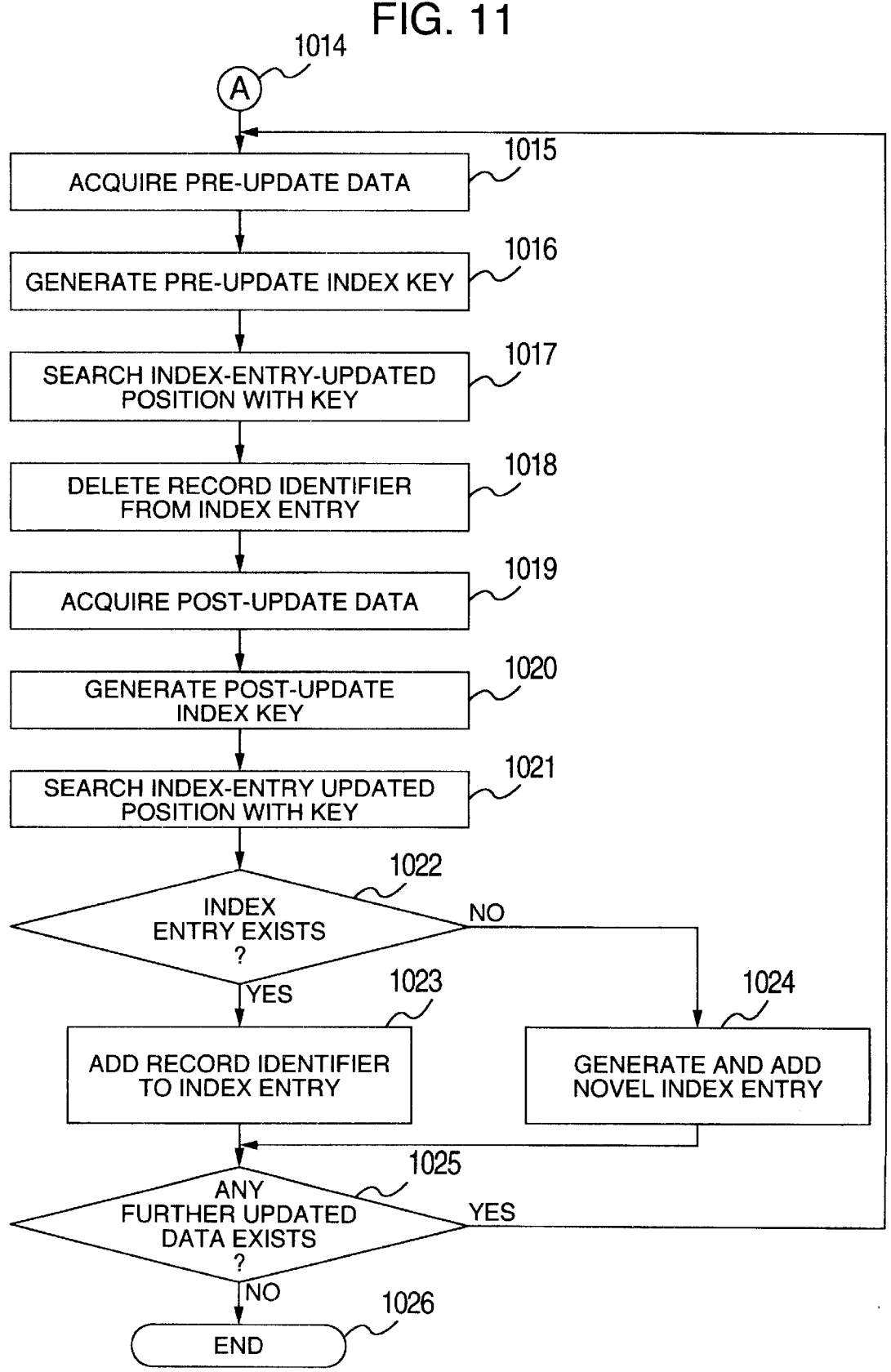
FIG. 11 is a flow charts for illustrating the update processing procedure executed by the index managing module in continuation to the processing illustrated in FIG. 10 according to an embodiment of the present invention.

FIGS. 10 and 11 are flow charts for illustrating a processing procedure executed by the index managing module 40 of the database managing system according to the instant embodiment of the invention. More specifically, there are illustrated in FIGS. 10 and 11 the contents of the index update processing 42 executed when the table data 21 containing the repetitive columns for which the index is defined is to be updated.

Update processing is performed on the index designated as the object to be updated through the execution procedure generated by the query analyze processing module 10. At first, the type of the processing performed on the table data 21 is decided by referencing the execution procedure generated by the query analyze processing module 10 in a step 1001. When the result of this decision shows that the processing performed on the table data is an insert processing, the processing then proceeds to a step 1002.

In the step 1002, the column data which constitutes the index to be updated is acquired from the inserted table data. In this conjunction, it is to be mentioned that acquisition of the column data from the inserted table data resident in the memory is preferred because of high efficiency. In the case of the repetitive column, one of the elements is acquired as the inserted data. Subsequently, in a step 1003, the index key is generated by using the data acquired in the step 1002. In a step 1004, search is performed for the whole index for finding the index-entry-updated position by using the index key generated precedingly. In a step 1005, decision is made as to whether or not the index entry corresponding to the concerned index key has been found. When the index entry has been found as being present, the processing then proceeds to a step 1006 where the record identifier is added to the index entry as found. On the other hand, unless the index entry is found in the decision step 1005 (i.e., when the step 1005 results in "No"), a novel index entry is generated and added to the index in a step 1007.

After completion of the update processing for one index entry in the steps 1006 and 1007, decision is then made in a step 1008 whether or not any further additional data exists. To say in another way, it is decided in the step 1008 whether or not any further element of the repetitive column exists. When the decision step 1008 results in affirmation "Yes", indicating presence of the additional data, then the step 1002 is resumed for adding the record identifier or the novel index entry, as described hereinbefore. When no additional data is present, this means that the update processing has been executed a number of times which corresponds to the number of elements of the repetitive column. Accordingly, the index update processing comes to an end (step 1026).

Turning back to the step 1001, when the decision results in a delete processing, the processing proceeds to a step 1009. In the step 1009, the column data which constitutes the index to be updated is acquired from the table data deleted. In this conjunction, the column data required for updating the index should preferably be stored in the memory upon deletion of the table data. In the case of the repetitive column, one of the elements is acquired as the deleted data.

Subsequently, in a step 1010, the index key is generated by using the data acquired in the step 1009. In a step 1011, search is performed for the whole index for thereby finding the index-entry-updated position by using the index key generated in the step 1010, whereon the record identifier is deleted from the index entry (step 1012). When the number of the record identifiers in the index entry becomes zero after deletion, the index entry itself may be deleted. In succession, decision is made in the step 1013 whether or not any further data deleted exist. In other words, it is decided in the step 1013 whether or not any further element of the repetitive column exists. When the decision step 1013 results in affirmation "Yes", indicating presence of the element, the step 1009 is resumed for performing the record identifier deletion processing for the index, as described above. When no data deleted is preset, this means that the update processing has been executed a number of times corresponding to the number of elements of the repetitive column, whereupon the index update processing is terminated (step 1026).

Turning back to the step 1001, when the decision in this step 1001 results in an update processing, the processing proceeds from the step 1014 to a step 1015. Steps succeeding to the step 14 are shown in FIG. 11. In the step 1015, pre-update column data (i.e., column data before update processing) which constitutes the index is acquired from the table data updated. Upon updating of the table data, the column data required for updating the index is stored as the pre-update column data in the memory. In the case of the repetitive column, one of the elements is acquired as the pre-update data. Subsequently, in a step 1016, the index key is generated by using the data acquired in the step 1015. In a step 1017, search is performed for the whole index for finding the index-entry-updated position by using the index key generated in the step 1016. In a step 1018, the record identifier is deleted from the index entry. When the number of the record identifiers in the index entry becomes zero due to the deletion, the index entry itself may be deleted. Subsequently, post-update column data (i.e., the column data after update processing) which constitutes the index for the updated table data is acquired in a step 1019.

In this conjunction, it is to be mentioned that the column data mentioned above should preferably be acquired from the updated table data resident in the memory because of high efficiency. In the case of the repetitive column, one of the elements is acquired as the post-update data. Subsequently, in a step 1020, the index key is generated by using the data acquired precedingly. In a step 1021, search for the whole index is performed for finding the index-entry-updated position by using the index key generated in the step 1020. In a step 1022, decision is made as to whether or not the index entry corresponding to the index key has been found. When the index entry has been found as being present, the processing then proceeds to a step 1023 where the record identifier is added to the index entry as found. By contrast, unless the index entry is found in the step 1022 (i.e., when the decision step 1022 results in "No"), a novel index entry is generated to be added to the index in a step 1024.

After completion of the update processing of one index entry in the steps 1023 and 1024, decision is then made in a step 1025 whether or not any further data updated exists. To say in another way, it is decided in the step 1025 whether or not any further element of the repetitive column exists. When the decision step 1025 results in affirmation "Yes", indicating the presence of the updated data, the step 1015 is resumed. When the data updated is absent, this means that the update processing has been carried out a number of times corresponding to the number of elements of the repetitive column. Accordingly, the index update processing comes to an end in the step 1026.

Figure 12:
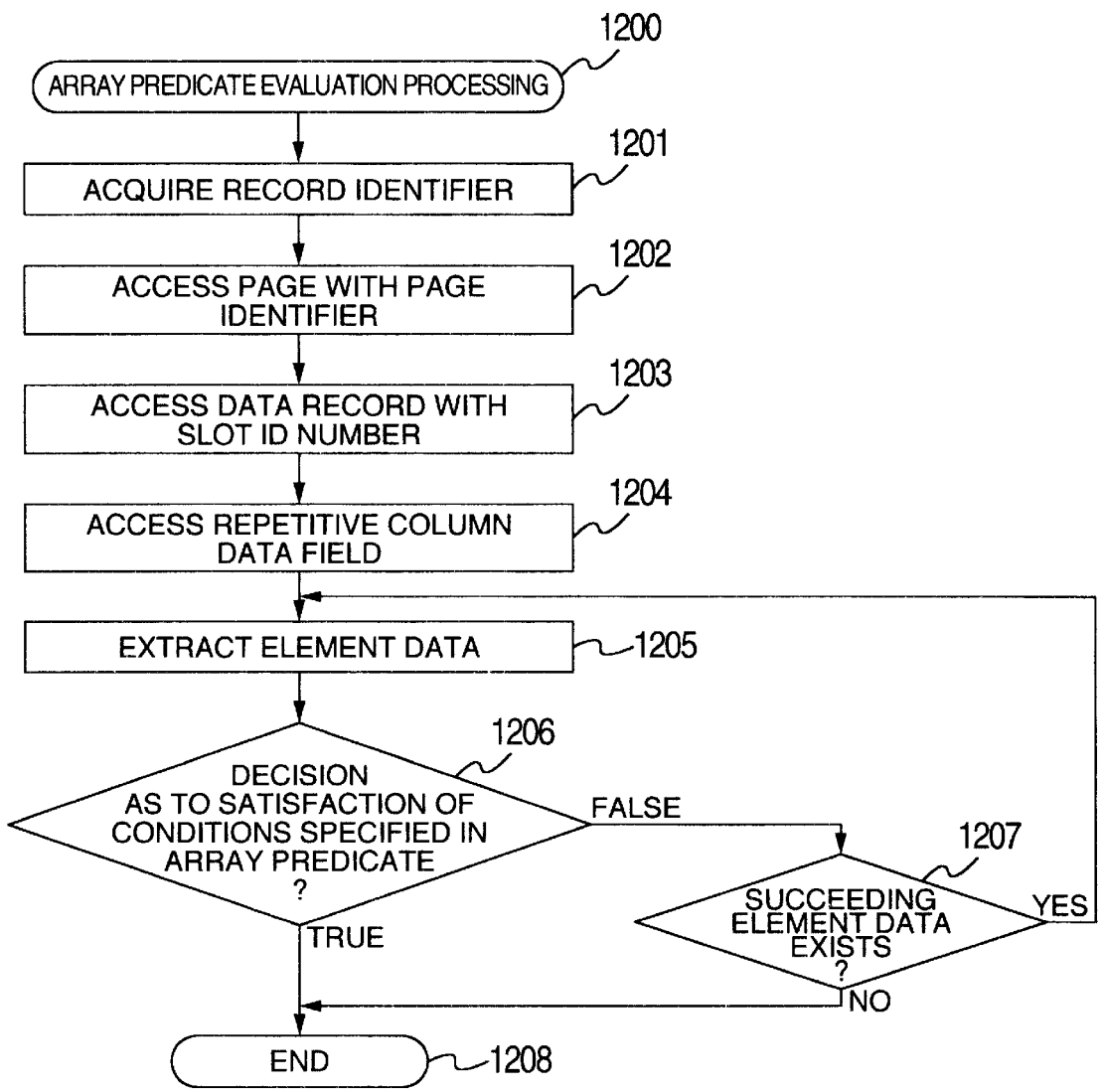
FIG. 12 is a flow chart for illustrating a processing procedure executed by a table data managing module of the database managing system according to an embodiment of the present invention.

FIG. 12 is a flow chart for illustrating a processing procedure executed by the table data managing module 30 of the database managing system according to the instant embodiment of the invention. More specifically, this figure illustrates the contents of the processing executed by the table data managing module 30 for the row data of the table on the presumption that the ARRAY predicate is contained in the query statement and that nonuse of the index for evaluation of the ARRAY predicate is specified by the execution procedure.

By accessing the data record with the record identifier for the ARRAY evaluation as acquired by using the index or the like, the designated column data is evaluated in the light of the ARRAY predicate. At first, in a step 1201 shown in FIG. 12, a record identifier for the row representing the search result candidate screened out by using the index or the like is acquired, whereon access is made to the page storing the data record with the page identifier contained in the record identifier in a step 1202. Further, access is made to the data record with the slot ID number contained in the record identifier in a step 1203, which is then followed by a step 1204 where access is made to the repetitive column data field. In a step 1205, one element data is extracted from the repetitive column, whereon decision is performed for the element data as to whether the conditions stipulated in the ARRAY predicate applies valid or not, i.e., "true" or "false", in a step 1206. In case the decision step 1206 results in being "true", the ARRAY predicate evaluation processing is terminated in a step 1208. In that case, further processing for extracting projected column data or the like may be performed.

On the other hand, in case the decision as to whether or not the conditions prescribed in the ARRAY predicate are met by the element data results in being "false" in a step 1208, then the processing proceeds to a step 1207 for making decision as to whether or not a succeeding element exists for thereby evaluating whether the conditions specified in the ARRAY predicate is met by the succeeding element data. When the succeeding element exists, the step 1205 is resumed. On the other hand, unless any further element data is present, the ARRAY predicate evaluation processing is terminated by issuing the final decision result of being "false". In this case, the ARRAY predicate evaluation processing may be performed for the succeeding data record.

The processings described above by reference to the flow charts are implemented in the form of program or programs which can be executed by the computer system illustrated, by way of example, in FIG. 4. In this conjunction, it should be noted that the programs mentioned above are never restricted to those stored in the external storage unit which is physically connected directly to the computer system such as illustrated in FIG. 2. The program(s) may be stored in a recording medium such as a hard disk device, a floppy disk or the like which can be accessed by a computer for read/write operations. Further, the program(s) may be stored in an external storage unit connected to another computer system which is provided separately from the computer system shown in FIG. 2.

In the database managing system described above, the function for evaluating the repetitive column is realized with the ARRAY predicate. It should however be understood that the present invention is n ever restricted to the ARRAY predicate. Other types of predicates or functions may be resorted to for substantially same effects. Furthermore, although the foregoing description has been made on the presumption that in conjunction with the function for realizing the ARRAY predicate, the values of elements of plural repetitive columns are handled in terms of a set or combination, the present invention is not always restricted to the function of the ARRAY predicate. By way of example, the present invention may be implemented by applied to the system in which a table definition statement "CREATE TABLE" with options being designated is adopted.

As is apparent from the foregoing, in the database managing system according to the illustrated embodiment of the invention, the set of the instances of a same data type can be stored in a single management table as the data of the column referred to as the repetitive column, whereby the database capacity for the table can be suppressed to a possible minimum. Besides, by virtue of capability of evaluating the elements of plural repetitive columns as a set or combination, search for the column handling the set can be performed at a high speed with a simplified query description or statement.

According to the teachings of the present invention disclosed herein, the access to the database can be realized very advantageously by managing the set of instances susceptible to mutual comparison as the column data referred to as the repetitive column.

What is claimed is:

1. A method of processing a database designed for handling data of such data type which includes a plurality of instances and which enables said instances to be identified by subscripts, said method comprising the steps of:
receiving a query containing a predicate or alternatively a function which includes a plurality of designations for column data of said data type and designation of conditions concerning said column data;
acquiring a set of instances which can be identified by a same subscript from the instances which constitute the column data of said data type, said column data being specified in said predicate or alternatively specified by said function; and
evaluating individual instances of said instance set acquired from at least two column data of said data type in view of the conditions specified in said predicate or alternatively specified by said function.

2. In a database processing method for analyzing a query issued to a database to thereby generate a corresponding execution procedure designation for performing a database processing in accordance with said execution procedure designation,
a database processing method for handling data of such data type which includes sets of instances and which enables individual instances to be identified by subscripts,
said method comprising the steps of:
receiving a query containing a predicate or alternatively a function which includes at least two designations for said column data of said data type and designation of conditions concerning said column data;
making decision as to whether or not an index has been generated for the column data specified in said predicate or alternatively by said function; and
determining an execution procedure such that said index is accessed in the case where said index has been generated.

3. A method of processing a database designed for handling data of such data type which is comprised of sets of instances and which enables the individual instances to be identified by subscripts,
said method comprising the steps of:
selecting an index generated for a plurality of column data including at least two column data of said data type when a row data insertion processing has to be executed in response to a query issued to said database,
acquiring from the row data inserted upon execution of the database processing a number of sets of instances capable of being identified by same relevant subscripts, respectively, among the instances constituting said column data of said data type which constitute said index, said number of the sets corresponding to a number of said subscripts;
generating a number of index entries on the basis of the acquired sets of instances and row identifiers for identifying said inserted row data, said number of the index entries corresponding to the number of said subscripts; and
maintaining said index by using said index entries generated.

4. A database processing method for handling data of such data type which includes sets of instances and which allows individual instances to be identified by subscripts,
said method comprising the steps of:
selecting an index generated for a plurality of column data including at least two column data of said data type when row data deletion processing is to be executed in response to a query issued to said database;
acquiring from the row data to be deleted upon execution of said row data deletion processing a number of sets of instances capable of being identified by same relevant subscripts, respectively, among the instances constituting the column data of said data type which constitute said index, said number of the sets corresponding to a number of said subscripts;
generating a number of index entries on the basis of the acquired sets of instances and row identifiers for identifying said row data to be deleted, said number of the index entries corresponding to the number of said subscripts; and
maintaining said index by using said index entries generated.

5. A database processing method for handling data of such data type which includes sets of instances and which allows individual instances to be identified by subscripts,
said method comprising the steps of:
selecting an index having constituent columns which contain column data to be updated from indexes generated for a plurality of column data including at least two column data of said data type when row data update processing is to be executed in response to a query issued to said database;
acquiring from pre-update column data upon execution of database processing a number of sets of instances capable of being identified by same relevant subscripts, respectively, among the instances constituting the column data of said data type which constitute said index, said number of the sets of instances corresponding to a number of said subscripts;
generating a number of index entries on the basis of the acquired sets of instances and row identifiers for identifying row data to be updated, said number of the index entries corresponding to the number of said subscripts;

acquiring from the updated row data a number of sets of instances capable of being identified by the same relevant subscripts, respectively, among the instances constituting said column data of said data type which constitute said index, said number of the sets of instances corresponding to a number of said subscripts;

generating a number of index entries on the basis of the acquired sets of instances and row identifiers for identifying said updated row data, said number of the index entries corresponding to the number of said subscripts; and maintaining said index by using said generated index entries.

6. A database processing method according to claim 2, wherein said index includes at least two column data of said data type as index constituting columns, said column data of said data type being constituted by sets of instances and allowing the individual instances to be identified by subscripts, and wherein said index is comprised of index entries each constituted by a set of instances capable of being identified by a same subscript among the instances which constitute the column data of said data type and a row identifier for identifying row data.

7. A database processing method according to claim 2, wherein said index includes at least two column data of said data type as index constituting columns, said column data of said data type being constituted by sets of instances and allowing the individual instances to be identified by subscripts, and wherein said index is comprised of index entries each constituted by a set of instances capable of being identified by a same subscript among the instances which constitute the column data of said data type, column data other than said column data of said data type and a row identifier for identifying row data.

8. A database processing method according to claim 2, wherein said index includes at least on column data of the data type as the index constituting column, said column data of said data type being constituted by a set of individual instances and allowing the individual instances to be identified by subscripts, and wherein said index is comprised of index entries each constituted by instances which constitute the column data of said data type, at least one column data other than said column data of said data type and a row identifier for identifying row data.

9. A database processing apparatus for analyzing a query issued to a database to thereby generate a corresponding execution procedure for performing database processing in accordance with said execution procedure, said apparatus being designed for handling data of such data type which includes sets of individual instances and which allows said individual instances to be identified by subscripts, comprising:

query analyze processing means which responds to a query issued to said database and containing at least two designations for column data of said data type and a predicate or alternatively a function containing designation of conditions concerning said column data, to thereby make decision as to whether or not an index is generated for the column data designated in said predicate or alternatively by said function to thereby generate an execution procedure for making access to table data for evaluating said predicate or alternatively said function when said index is not generated; and table data managing means for acquiring in accordance with said generated execution procedure said table data to thereby acquire sets of instances each capable of being identified by a same subscript among the instances which constitute the column data of said data type as designated in said predicate for thereby evaluating the individual instances in view of said conditions designated in said predicate.

10. A database processing apparatus for analyzing a query issued to a database to thereby generate a corresponding execution procedure for performing database processing in accordance with said execution procedure, said apparatus being designed for handling data of such data type which includes sets of individual instances and which allows the individual instances to be identified by subscripts, comprising:

query analyze processing means which responds to a query issued to the database and containing at lest two designations for column data of said data type and a predicate or alternatively a function containing designation of conditions concerning said column data, to thereby make decision as to whether or not an index is generated for the column data designated in said predicate or alternatively by said function, for thereby generating such an execution procedure that said index is accessed when said index is generated;

index managing means for making access to said index in accordance with said generated execution procedure to thereby acquire an identifier of table data which meets the conditions designated in said predicate or by said function; and table data managing means for performing evaluation of the table data in view of said designated conditions.

11. A database processing apparatus for analyzing a query issued to a database to thereby generate a corresponding execution procedure for performing database processing in accordance with said execution procedure, said apparatus being designed for handling data of such data type which includes sets of instances and which allows individual instances to be identified by subscripts, comprising:

query analyze processing means for generating an execution procedure designed to perform a maintenance processing for an index which contains at least two column data of said data type to be inserted, deleted or alternatively updated through row data insert processing, delete processing or alternatively update processing; and index managing means for acquiring from the row data a number of sets of instances capable of being identified by same relevant subscripts, respectively, among the instances constituting said column data of said data type which constitute said index in accordance with said generated execution procedure, said number of the sets of instances corresponding to a number of said subscripts, to thereby generate a number of index entries on the basis of the set of said acquired instances and row identifiers for identifying rows containing said instances acquired, said number of the index entries corresponding to the number of said subscripts, whereby maintenance of said index is performed by using said generated index entries.

12. A medium recording thereon a program executable with a computer for a database processing system for handling a query issued to a database to thereby generate a corresponding execution procedure for performing database processing in accordance with said execution procedure, said program being designed for handling data of such data type which includes sets of individual instances and which allows said individual instances to be identified by subscripts, comprising:

a query analyze processing module which responds to a query issued to said database and containing at least two designations for column data of said data type and a predicate or alternatively a function containing designation of conditions concerning said column data, to thereby make decision as to whether or not an index is generated for the column data designated in said predicate or alternatively by said function to thereby generate an execution procedure for making access to table data for evaluating said predicate or alternatively said function when said index is not generated; and a table data managing module for acquiring in accordance with said generated execution procedure said table data to thereby acquire sets of instances each capable of being identified by a same subscript among the instances which constitute the column data of said data type as designated in said predicate for thereby evaluating the individual instances in view of said conditions designated in said predicate.

13. A medium recording thereon a program executable with a computer for a database processing system for handling a query issued to a database to thereby generate a corresponding execution procedure for performing database processing in accordance with said execution procedure, said program being designed for handling data of such data type which includes sets of individual instances and which allows said individual instances to be identified by subscripts, comprising:

a query analyze processing module which responds to a query issued to the database and containing at least two designations for column data of said data type and a predicate or alternatively a function containing designation of conditions concerning said column data, to thereby make decision as to whether or not an index is generated for the column data designated in said predicate or alternatively by said function, for thereby generating such an execution procedure that said index is accessed when said index is generated; and an index managing module for making access to said index in accordance with said generated execution procedure to thereby acquire an identifier of table data which meets the conditions designated in said predicate or by said function.

14. A medium recording thereon a program executable with a computer for a database processing system for handling a query issued to a database to thereby generate a corresponding execution procedure for performing database processing in accordance with said execution procedure, said program being designed for handling data of such data type which includes sets of individual instances and which allows said individual instances to be identified by subscripts, comprising:

a query analyze processing module for generating an execution procedure designed to perform a maintenance processing for an index which contains at least two column data of said data type to be inserted, deleted or alternatively updated through row data insert processing, delete processing or alternatively update processing; and an index managing module for acquiring from the row data a number of sets of instances capable of being identified by same relevant subscripts, respectively, among the instances constituting said index in accordance with said generated execution procedure, said number of the sets of instances corresponding to a number of said subscripts, to thereby generate a number of index entries on the basis of the set of said acquired instances and row identifiers for identifying rows containing said instances acquired, said number of the index entries corresponding to the number of said subscripts, wherein maintenance of said index is performed by using said generated index entries.

* * * * *